United States Patent
Cho et al.

(10) Patent No.: US 9,127,188 B2
(45) Date of Patent: Sep. 8, 2015

(54) ADHESIVE FILM AND OPTICAL DISPLAY INCLUDING THE SAME

(71) Applicant: CHEIL INDUSTRIES INC., Gumi-si, Gyeongsangbuk-do (KR)

(72) Inventors: Ik Hwan Cho, Uiwang-si (KR); Chan Woo Kim, Uiwang-si (KR); Ki Yong Kim, Uiwang-si (KR); Lee June Kim, Uiwang-si (KR); In Cheon Han, Uiwang-si (KR)

(73) Assignee: Cheil Industries, Inc., Gumi-si (KR)

( * ) Notice: Subject to any disclaimer, the term of this patent is extended or adjusted under 35 U.S.C. 154(b) by 70 days.

(21) Appl. No.: 14/141,380

(22) Filed: Dec. 26, 2013

(65) Prior Publication Data

US 2014/0184053 A1    Jul. 3, 2014

(30) Foreign Application Priority Data

Dec. 27, 2012   (KR) .................. 10-2012-0155603
Nov. 15, 2013   (KR) .................. 10-2013-0139386

(51) Int. Cl.
  *H05B 33/12*   (2006.01)
  *C09J 7/00*   (2006.01)
  *G06F 3/041*   (2006.01)

(52) U.S. Cl.
  CPC ............ *C09J 7/00* (2013.01); *G06F 3/0412* (2013.01); *C09J 2201/622* (2013.01); *C09J 2203/318* (2013.01); *C09J 2433/00* (2013.01)

(58) Field of Classification Search
  CPC ........... C09J 7/02; C09J 7/00; C09J 2433/00; C09J 2483/00; C09J 2203/318; C09J 2201/622; H05B 33/14; Y10T 428/24405; H01L 51/5268; H01L 51/5262; H01L 51/5246; H01L 51/5275; G06F 3/0412
  USPC .............. 313/112, 498–512; 526/318.42, 320
  See application file for complete search history.

(56) References Cited

U.S. PATENT DOCUMENTS

| 6,013,722 | A  |   | 1/2000  | Yang et al. |
| 2009/0053519 | A1 |   | 2/2009 | Ogawa et al. |
| 2010/0001634 | A1 |   | 1/2010 | Fujita et al. |
| 2010/0112348 | A1 |   | 5/2010 | Kondo et al. |
| 2010/0330354 | A1 | * | 12/2010 | Tsukagoshi et al. ......... 428/220 |
| 2011/0104483 | A1 | * | 5/2011 | Shinozaki et al. ........... 428/347 |

FOREIGN PATENT DOCUMENTS

| CN | 1284106 A | 2/2001 |
| CN | 1394928 A | 2/2003 |
| CN | 101368072 A | 2/2009 |

(Continued)

OTHER PUBLICATIONS

SIPO Office action dated Dec. 31, 2014 in corresponding CN application No. 201310741074.6, with English translation, 13 pages.

*Primary Examiner* — Anne Hines
*Assistant Examiner* — Jose M Diaz
(74) *Attorney, Agent, or Firm* — Christie, Parker & Hale, LLP

(57) ABSTRACT

An adhesive film and an optical display including the same. The adhesive film has a tan δ of about 0.12 to about 0.4 upon frequency sweep testing under conditions of a strain of 5%, 30° C. and 1 rad/s, and a tan δ of about 0.2 to about 0.7 upon frequency sweep testing under conditions of a strain of 5%, 30° C. and 100 rad/s.

17 Claims, 1 Drawing Sheet

(56) References Cited

FOREIGN PATENT DOCUMENTS

| CN | 101429416 A | 5/2009 |
| CN | 101511924 A | 8/2009 |
| CN | 102260478 A | 11/2011 |
| CN | 102816534 A | 12/2012 |

* cited by examiner

ADHESIVE FILM AND OPTICAL DISPLAY INCLUDING THE SAME

CROSS-REFERENCE TO RELATED APPLICATIONS

This application claims priority to and the benefit of Korean Patent Application No. 10-2012-0155603, filed in the Korean Intellectual Property Office on Dec. 27, 2012, and Korean Patent Application No. 10-2013-0139386, filed in the Korean Intellectual Property Office on Nov. 15, 2013, the entire contents of both are incorporated herein by reference.

BACKGROUND

1. Field

The following description relates to an adhesive film and an optical display including the same.

2. Description of the Related Art

In a capacitive touch panel, a capacitive touchpad is attached to a window or a film via a transparent adhesive film to sense touching on the window or film upon operation by a change in the capacitance. In such a touchpad, when a user's hand or a certain article (conductor or liquid) approaches or is brought into contact with a unipolar detection plate and causes a change in the dielectric constant of the unipolar detection plate, a switching signal is generated through a change in capacitance due to the change in the dielectric constant of the unipolar detection plate.

Recently, flexible optical displays have been developed and adhesive films for the flexible optical displays are required to have excellent bending properties. Insufficient bending properties of the adhesive film may cause detachment, generate bubbles (bubbling), or create dragging marks.

SUMMARY

In accordance with one embodiment of the present invention, an adhesive film may have a tan δ of about 0.12 to about 0.4 upon frequency sweep testing under conditions of a strain of 5%, 30° C. and 1 rad/s, and a tan δ of about 0.2 to about 0.7 upon frequency sweep testing under conditions of a strain of 5%, 30° C. and 100 rad/s.

In accordance with another embodiment of the present invention, an optical display includes a substrate, an organic light emitting device (OLED) element on the substrate; an encapsulation layer on the OLED element to encapsulate the OLED element, a first adhesive film on the encapsulation layer; a transparent conductor on the first adhesive film and including a base material, a first transparent conductive layer on an upper side of the base material and a second transparent conductive layer on a lower side of the base material; a polarizing plate on the first transparent conductive layer; a second adhesive film on the polarizing plate; and a window on the second adhesive film, wherein at least one of the first adhesive film and second adhesive film includes the adhesive film according to one embodiment of the present invention.

DETAILED DESCRIPTION

Figure 1:
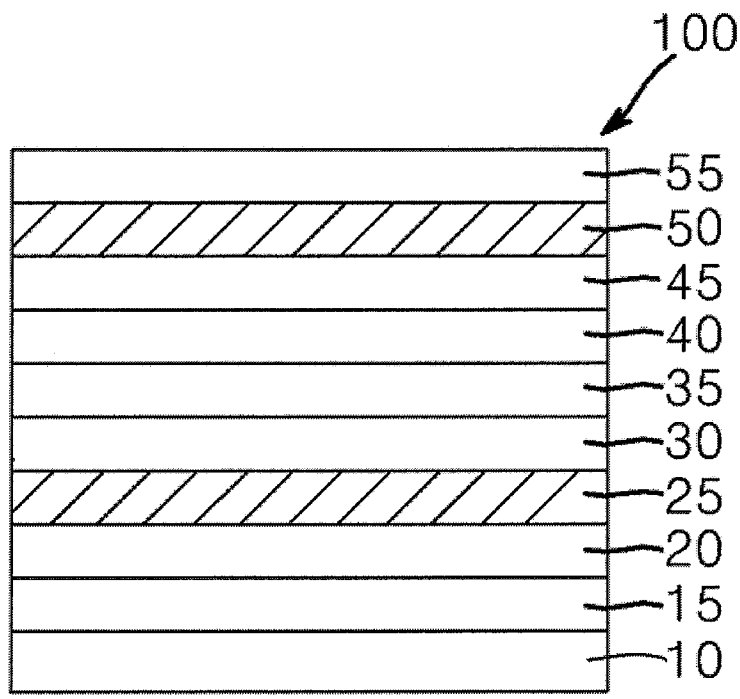
FIG. 1 is a cross-sectional view of a display of an organic light emitting device according to one embodiment of the present invention.

Hereinafter, embodiments of the invention will be described in more detail with reference to the accompanying drawings. It should be understood that the present invention is not limited to the following embodiments and may be embodied in different ways, and that the embodiments are given to provide complete disclosure of the invention and to provide thorough understanding of the invention to those skilled in the art. In the drawings, components irrelevant to the description are omitted for clarity. Like components will be denoted by like reference numerals throughout the specification. In the following description, terms such as "upper side" and "lower side" are defined with reference to the accompanying drawings. Thus, it should be understood that the term "upper side" may be used interchangeably with the term "lower side". In addition, "(meth)acrylate" may refer to acrylates and/or methacrylates. Expressions such as "at least one of," when preceding a list of elements, modify the entire list of elements and do not modify the individual elements of the list. Further, the use of "may" when describing embodiments of the present invention refers to "one or more embodiments of the present invention."

In accordance with one embodiment of the present invention, an adhesive film may have a tan δ of about 0.12 to about 0.4 upon frequency sweep testing under conditions of a strain of 5%, 30° C. and 1 rad/s, and a tan δ of about 0.2 to about 0.7 upon frequency sweep testing under conditions of a strain of 5%, 30° C. and 100 rad/s. When the tan δ of the adhesive film is not within this range, the adhesive film may not exhibit suitable bending properties. As used herein, an adhesive film with suitable "bending properties" refers to an adhesive film that may be repeatedly bent 1000 times or more in a stacked state without any detachment or appearance of bubbling.

In one embodiment, the adhesive film may have a tan δ of about 0.12 to about 0.38, for example, about 0.14 to about 0.38, or about 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37 or 0.38, upon frequency sweep testing under conditions of a strain of 5%, 30° C. and 1 rad/s. In addition, the adhesive film may have a tan δ of about 0.3 to about 0.7, for example, about 0.3 to about 0.65, or about 0.3, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64 or 0.65 upon frequency sweep testing under conditions of a strain of 5%, 30° C. and 100 rad/s. Within this range, the adhesive film may achieve excellent bending properties without detachment, bubbling or drag marks upon bending.

tan δ refers to a ratio of loss modulus G" to storage modulus G' (G"/G') as measured by frequency sweep testing, as represented by Equation 1:

$$\tan \delta = \text{loss modulus } G''/\text{storage modulus } G'. \qquad \text{Equation 1}$$

The adhesive film may have a storage modulus of about $7 \times 10^4$ dyne/cm$^2$ to about $1 \times 10^7$ dyne/cm$^2$ and a loss modulus of about $1 \times 10^4$ dyne/cm$^2$ to about $8 \times 10^6$ dyne/cm$^2$ upon frequency sweep testing under conditions of a strain of 5%, 30° C. and 1 rad/s. Within this range, the adhesive film may have a tan δ in the range described above, and thereby have improved bending properties.

In one embodiment, the adhesive film may have (e.g., has) a storage modulus from about $1 \times 10^5$ dyne/cm$^2$ to about $5 \times 10^7$ dyne/cm$^2$, for example, from about $1 \times 10^5$ dyne/cm$^2$ to about $3 \times 10^6$ dyne/cm$^2$, or from about $3 \times 10^5$ to about $3 \times 10^6$ dyne/cm$^2$; and a loss modulus from about $1 \times 10^4$ dyne/cm$^2$ to about $3 \times 10^7$ dyne/cm$^2$, for example, from about $3 \times 10^4$ dyne/cm$^2$ to about 3×10⁷ dyne/cm², upon frequency sweep testing under conditions of a strain of 5%, 30° C. and 100 rad/s. Within this range, the adhesive film may have a tan δ in the range described above, and thereby have improved bending properties.

In another embodiment, the adhesive film may have a storage modulus from about 1×10³ dyne/cm² to about 5×10⁶ dyne/cm², for example, from about 6×10⁴ dyne/cm² to about 5×10⁶ dyne/cm², or from about 7×10⁴ dyne/cm² to about 9×10⁵ dyne/cm² upon frequency sweep testing under conditions of a strain of 5%, 80° C. and 1 rad/s. Within this range, the adhesive film may have improved durability and reliability.

The adhesive film may have a gel fraction from about 40% to about 90%, for example, from about 50% to about 85%. Within this range, the adhesive film may have good reliability.

The adhesive film may have a resistance variation ΔR (as calculated according to Equation 2) of about 5% or less, for example, from about 2% to about 5%:

$$\Delta R = \frac{P_2 - P_1}{P_1} \times 100 \quad \text{Equation 2}$$

where $P_1$ is an initial resistance measured on a sample with electrodes formed at both ends of the adhesive film, and $P_2$ is a resistance of the sample after storage at 60° C./90% relative humidity (RH) for 240 hours. The adhesive film having a resistance variation of 5% or less may have a reduced capacitance and improved sensing capabilities by reducing the signal retardation when used in a touch panel.

The adhesive film may have good transparency. In one embodiment, the adhesive film may have a haze of about 1% or less (for example, from about 0.1% to about 0.9%) and a total transmittance of about 90% or more (for example, from about 95% to about 99%), in the visible light range.

Thus, the adhesive film may be used as a protective film applied to flexible displays, or as an optically clear adhesive (OCA) film applied to mobile phones, TVs, monitors, tablet PCs, or the like, without being limited thereto.

The adhesive film may be prepared from an adhesive composition including a (meth)acrylic copolymer, an initiator, and a crosslinking agent. The adhesive film may be prepared by, for example, coating the adhesive composition onto a release film (for example, a polyester film including a polyethylene terephthalate film), followed by UV curing. In one embodiment, UV curing may be performed at about 50 mW/cm² or less for about 20 seconds to about 240 seconds. In one embodiment, curing is performed in an anoxic environment. Although there is no particular restriction as to the coating thickness, the coating thickness may be from about 50 μm to about 2 mm, for example, from about 50 μm to about 1.5 mm.

Although the thickness of the adhesive film (thickness excluding the thickness of the release film) is not particularly limited, the adhesive film may have a thickness from about 10 μm to about 1 mm, for example, from about 50 μm to about 1.5 mm.

The adhesive composition according to the present invention may include a (meth)acrylic copolymer. The (meth)acrylic copolymer is a copolymer of a polymerization product of a mixture of photocurable monomers (e.g., (meth)acrylic monomers). Here, the mixture of photocurable monomers may include at least one of a monomer having a glass transition temperature (Tg) of about 80° C. or more, for example, from about 80° C. to about 150° C., and a monomer having a glass transition temperature of less than about 80° C., for example, from about −80° C. to about 30° C. In one embodiment, the mixture of photocurable monomers may include, 40% by weight (wt %) or less (for example, about 0 wt % to about 40 wt %, about 0.0001 wt % to about 40 wt %) of the monomer having a glass transition temperature of 80° C. or more, and about 60 wt % to about 100 wt % (for example, about 0.0001 wt % to about 99.9999 wt %) of the monomer having a glass transition temperature of less than 80° C.

For example, the mixture of photocurable monomers may include about 30 wt % or less (for example, about 0 wt % to about 30 wt %) of the monomer having a glass transition temperature of about 80° C. or more, and about 70 wt % to about 100 wt % of the monomer having a glass transition temperature of less than 80° C. For example, the mixture of photocurable monomers may include about 25 wt % or less (for example, about 0 wt % to about 25 wt %) of the monomer having a glass transition temperature of about 80° C. or more, and about 75 wt % to about 100 wt % of the monomer having a glass transition temperature of less than 80° C.

The monomer having a glass transition temperature of about 80° C. or more may include at least one selected from among an alicyclic group-containing (meth)acrylic monomer, a carboxylic acid group-containing vinyl monomer, and a hetero-alicyclic group-containing (meth)acrylic monomer, without being limited thereto.

The alicyclic group-containing (meth)acrylic monomer may include a (meth)acrylic acid ester having a $C_4$ to $C_{20}$ mono- or poly-alicyclic ring. For example, the alicyclic group-containing (meth)acrylic monomer may include a (meth)acrylic acid ester having a $C_6$ to $C_{20}$ mono- or poly-alicyclic ring such as isobornyl(meth)acrylate, cyclopentyl (meth)acrylate, cyclohexyl(meth)acrylate, or the like. The alicyclic group-containing (meth)acrylic monomer may be present in an amount of 30 wt % or less (for example, about 0 wt % to about 30 wt %) in the mixture for the (meth)acrylic copolymer in terms of solid content (i.e., the total weight of all monomers excluding the amount of solvents). Within this range, the (meth)acrylic copolymer may improve the durability of the adhesive film.

The carboxylic acid group-containing vinyl monomer may include a carboxylic acid having a vinyl group, or a (meth) acrylic acid ester having a carboxylic acid. For example, the carboxylic acid group-containing vinyl monomer may include at least one selected from the group consisting of β-carboxyethyl(meth)acrylate, (meth)acrylic acid, itaconic acid, maleic acid, fumaric acid, and vinyl acetate, without being limited thereto. The carboxylic acid group-containing vinyl monomer may be present in an amount of less than about 3 wt % (about 0 wt % to about 3 wt %), for example, in an amount of about 2 wt % or less (about 0 wt % to about 2 wt %), in the mixture for the (meth)acrylic copolymer in terms of solid content. Within this range, the (meth)acrylic copolymer may improve adhesion of the adhesive film.

The hetero-alicyclic group-containing (meth)acrylic monomer may include a (meth)acrylic monomer having a $C_4$ to $C_6$ homogeneous alicyclic ring including nitrogen, oxygen or sulfur. For example, the hetero-alicyclic group-containing (meth)acrylic monomer may include (meth)acryloyl morpholine. The hetero-alicyclic group-containing (meth)acrylic monomer may be present in an amount of about 10 wt % or less (for example, about 0 wt % to about 10 wt %), for example, about 5 wt % or less (for example, about 0 wt % to about 5 wt %), in the mixture for the (meth)acrylic copolymer in terms of solid content. Within this range, the adhesive film may exhibit improved adhesion to a glass material.

The monomer having a glass transition temperature of less than 80° C. may include at least one selected from among an alkyl group-containing (meth)acrylic monomer and a hydroxyl group-containing (meth)acrylic monomer, without being limited thereto.

The alkyl group-containing (meth)acrylic monomer may include a linear or branched $C_1$ to $C_{20}$ alkyl group-containing (meth)acrylic acid ester. For example, the alkyl group-containing (meth)acrylic monomer may include at least one selected from among methyl(meth)acrylate, ethyl(meth)acrylate, propyl(meth)acrylate, n-butyl(meth)acrylate, t-butyl(meth)acrylate, iso-butyl(meth)acrylate, pentyl(meth)acrylate, hexyl(meth)acrylate, heptyl(meth)acrylate, ethylhexyl(meth)acrylate, octyl(meth)acrylate, iso-octyl (meth)acrylate, nonyl(meth)acrylate, decyl(meth)acrylate, and lauryl(meth)acrylate. The alkyl group-containing (meth)acrylic monomer may be present in an amount of about 40 wt % to about 70 wt % in the mixture for the (meth)acrylic copolymer in terms of solid content. Within this range, the adhesive film may exhibit excellent adhesion.

The hydroxyl group-containing (meth)acrylic monomer may include a (meth)acrylic acid ester containing $C_1$ to $C_{20}$ alkyl group, $C_5$ to $C_{20}$ cycloalkyl group or $C_6$ to $C_{20}$ aryl group, having at least one hydroxyl group. For example, the hydroxyl group-containing (meth)acrylic monomer may include at least one selected from among 2-hydroxyethyl (meth)acrylate, 4-hydroxybutyl(meth)acrylate, 2-hydroxypropyl(meth)acrylate, 2-hydroxybutyl(meth)acrylate, 6-hydroxyhexyl(meth)acrylate, 1,4-cyclohexanedimethanol mono(meth)acrylate, 1-chloro-2-hydroxypropyl(meth)acrylate, diethyleneglycol mono(meth)acrylate, 1,6-hexanediol mono(meth)acrylate, pentaerythritol tri(meth)acrylate, dipentaerythritol penta(meth)acrylate, neopentyiglycol mono(meth)acrylate, trimethyloipropane di(meth)acrylate, trimethylolethane di(meth)acrylate, 2-hydroxy-3-phenyloxypropyl(meth)acrylate, 4-hydroxycyclopentyl(meth)acrylate, 2-hydroxy-3-phenyloxy(meth)acrylate, and 4-hydroxycyclohexyl(meth)acrylate, without being limited thereto. The hydroxyl group-containing (meth)acrylic monomer may be present in an amount of about 20 wt % to about 50 wt % in the mixture for the (meth)acrylic copolymer in terms of solid content. Within this range, the adhesive film may exhibit excellent adhesion and durability.

The (meth)acrylic copolymer may be a copolymer of a polymerization product of a mixture of photocurable monomers, which may include about 40 wt % to about 70 wt % of the alkyl group-containing (meth)acrylic monomer, about 20 wt % to about 50 wt % of the hydroxyl group-containing (meth)acrylic monomer, about 30 wt % or less (for example, about 0 wt % to about 30 wt %, about 0.01 wt % to about 30 wt %) of the alicyclic group-containing (meth)acrylic monomer, about 5 wt % or less (for example, about 0 wt % to about 5 wt %, about 0.01 wt % to about 5 wt %) of the hetero-alicyclic group-containing (meth)acrylic monomer, and about 2 wt % or less (for example, about 0 wt % to about 2 wt %, about 0.01 wt % to about 2 wt %) of the carboxylic acid group-containing (meth)acrylic monomer.

In one embodiment, the (meth)acrylic copolymer may be a copolymer of a polymerization product of a mixture of photocurable monomers, which may include the alkyl group-containing (meth)acrylic monomer in an amount of about 40 wt % to about 60 wt %, for example, in an amount of 40, 41, 42, 43, 44, 45, 46, 47, 48, 49, 50, 51, 52, 53, 54, 55, 56, 57, 58, 59, or 60 wt %; the hydroxyl group-containing (meth)acrylic monomer in an amount of about 20 wt % to about 50 wt %, for example, in an amount of 20, 21, 22, 23, 24, 25, 25, 26, 27, 28, 29, 30, 31, 32, 33, 34, 35, 36, 37, 38, 39, 40, 41, 42, 43, 44, 45, 46, 47, 48, 49, or 50 wt %; the alicyclic group-containing (meth)acrylic monomer in an amount of about 1 wt % to about 30 wt %, for example, in an amount of 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt %; and the carboxylic acid group-containing (meth)acrylic monomer in an amount of about 1 wt % to about 2 wt %, for example, in an amount of 1, 1.5, or 2 wt %. For example, the (meth)acrylic copolymer may be a copolymer of a polymerization product of a mixture of photocurable monomers, which may include about 54 wt % to about 60 wt % of the alkyl group-containing (meth)acrylic monomer, about 20 wt % to about 25 wt % of the hydroxyl group-containing (meth)acrylic monomer, about 15 wt % to about 20 wt % of the alicyclic group-containing (meth)acrylic monomer, and about 1 wt % to about 2 wt % of the carboxylic acid group-containing (meth)acrylic monomer.

In another embodiment, the (meth)acrylic copolymer may be a copolymer of a polymerization product of a mixture of photocurable monomers, which may include the alkyl group-containing (meth)acrylic monomer in an amount of about 60 wt % to about 65 wt %, for example, in an amount of 60, 61, 62, 63, 64, or 65 wt %; the hydroxyl group-containing (meth)acrylic monomer in an amount of about 30 wt % to about 35 wt %, for example, in an amount of 30, 31, 32, 33, 34, or 35 wt %; and the hetero-alicyclic group-containing (meth)acrylic monomer in an amount of about 1 wt % to about 5 wt %, for example, in an amount of 1, 2, 3, 4, or 5 wt %.

In a further embodiment, the (meth)acrylic copolymer may be a copolymer of a polymerization product of a mixture of photocurable monomers, which may include the alkyl group-containing (meth)acrylic monomer in an amount of about 60 wt % to about 70 wt %, for example, in an amount of 60, 61, 62, 63, 64, 65, 66, 67, 68, 69, or 70 wt %, and the hydroxyl group-containing (meth)acrylic monomer in an amount of about 30 wt % to about 40 wt %, for example, in an amount of 30, 31, 32, 33, 34, 35, 36, 37, 38, 39, or 40 wt %.

The initiator may include a photopolymerization initiator. The photopolymerization initiator is activated by UV or electron beans to promote radical reaction through activation of the carbon-carbon double bonds in the adhesive film.

In one embodiment, the initiator may include acetophenone compounds or a mixture thereof, without being limited thereto. Examples of the acetophenone initiators may include 2,2-dimethoxy-2-phynylacetophenone, 2,2'-diethoxyacetophenone, 2,2'-dibutoxyacetophenone, 2-hydroxy-2-methylpropiophenone, p-t-butyl trichloroacetophenone, p-t-butyl dichioroacetophenone, 4-chloroacetophenone, 2,2'-dichloro-4-phenoxyacetophenone, 2-methyl-1-(4-(methylthio)phenyl)-2-morpholino propan-1-one, 2-benzyl-2-dimethylamino-1-(4-morpholinophenyl)-butan-1-one, and mixtures thereof.

The initiator may be present in an amount of about 0.1 to about 10 parts by weight, for example, about 0.1 to about 1 part by weight, based on 100 parts by weight of the (meth) acrylic copolymer or the mixture of photocurable monomers. Within this range, the initiator may provide complete curing of the adhesive film composition.

The crosslinking agent may include a polyfunctional (meth)acrylate curable by active energy rays.

Examples of the crosslinking agent may include bi-functional acrylates, such as 1,4-butanediol di(meth)acrylate, 1,6-hexanediol di(meth)acrylate, neopentylglycol di(meth)acrylate, polyethyleneglycol di(meth)acrylate, neopentylglycol adipate di(meth)acrylate, dicyclopentanyl di(meth)acrylate, caprolactone-modified dicyclopentenyl di(meth)acrylate, ethylene oxide-modified di(meth)acrylate, di(meth)acryloxy ethyl isocyanurate, allylated cyclohexyl di(meth)acrylate, tricyclodecane dimethanol(meth)acrylate, dimethylol dicyclopentane di(meth)acrylate, ethylene oxide-modified hexahydrophthalic acid di(meth)acrylate, tricyclodecane dimethanol (meth)acrylate, neopentylglycol-modified trimethylpropane di(meth)acrylate, adamantane di(meth)acrylate, 9,9-bis[4-(2-acryloyloxethoxy)phenyl]fluorine, or the like; tri-functional acrylates, such as trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, tri-functional urethane(meth)acrylate, tris(meth)acryloxyethyl isocyanurate, or the like; tetra-functional acrylates, such as diglycerin tetra(meth)acrylate, pentaerythritol tetra(meth)acrylate, or the like; penta-functional acrylates, such as dipentaerythritol penta(meth)acrylate, or the like; hexa-functional acrylates, such as dipentaerythritol hexa(meth)acrylate, caprolactone-modified dipentaerythritol hexa(meth)acrylate, urethane(meth)acrylate (for example, reaction products of an isocyanate monomer and trimethylolpropane tri(meth)acrylate), or the like, without being limited thereto. These may be used alone or in combination thereof. For example, the crosslinking agent may be a polyfunctional (meth)acrylate of polyvalent alcohol.

In addition, the crosslinking agent may include isocyanate, epoxy, aziridine, melamine, amine, imide, carbodiimide, amide crosslinking agents, or mixtures thereof.

The crosslinking agent may be present in an amount of about 0.01 to about 0.15 parts by weight, for example, about 0.01 to about 0.1 parts by weight, for example, 0.01, 0.02, 0.03, 0.04, 0.05, 0.06, 0.07, 0.08, 0.09, or 0.1 parts by weight, based on 100 parts by weight of the (meth)acrylic copolymer or the mixture of photocurable monomers. Within this range, the crosslinking agent may provide a suitable degree of crosslinking upon UV reaction and the adhesive film may exhibit suitable chemical resistance and improved durability and reliability.

The adhesive composition may further include a silane coupling agent.

Any suitable silane coupling agent known in the art may be used. For example, the silane coupling agent may include at least one selected from the group consisting of silicon compounds having an epoxy moiety (such as 3-glycidoxypropyltrimethoxysilane, 3-glycidoxypropyltriethoxysilane, 3-glycidoxypropylmethyldimethoxysilane, 2-(3,4-epoxycyclohexyl)ethyltrimethoxysilane, or the like); polymerizable unsaturated group-containing silicon compounds (such as vinyltrimethoxysilane, vinyltrimethoxysilane, (meth)acryloxypropyltrimethoxysilane, or the like); amino group-containing silicon compounds (such as 3-aminopropyltrimethoxysilane, N-(2-aminoethyl)-3-aminopropyltrimethoxysilane, N-(2-aminoethyl)-3-aminopropylmethyldimethoxysilane, or the like); and 3-chloropropyltrimethoxysilane, without being limited thereto. For example, the silane coupling agent may have an epoxy moiety.

The silane coupling agent may be present in an amount of about 0.01 to about 1 part by weight, for example, about 0.01 to about 0.5 parts by weight, based on 100 parts by weight of the (meth)acrylic copolymer or the mixture of photocurable monomers. Within this content range of the silane coupling agent, the adhesive film may exhibit excellent reliability and improved adhesion.

The adhesive composition may further include other suitable additives, such as curing accelerators, ionic liquids, lithium salts, inorganic fillers, softening agents, antioxidants, anti-aging agents, stabilizers, tackifier resins, modifying resins (such as polyol, phenol, acrylic, polyester, polyolefin, epoxy, epoxidized polybutadiene resins, or the like), leveling agents, antifoaming agents, plasticizers, dyes, pigments (such as coloring pigments, extender pigments, or the like), treatment agents, UV protective agents, fluorescence brightening agents, dispersants, heat stabilizers, light stabilizers, UV absorbents, antistatic agents, lubricants, or solvents, as needed.

The additives may be present in an amount of about 0.01 to about 5 parts by weight, for example, 0.03 to about 3 parts by weight, or about 0.05 to about 2 parts by weight, based on 100 parts by weight of the copolymer.

The adhesive composition may be obtained in a liquid phase by mixing the monomers and the initiator, followed by partial polymerization through UV irradiation. Thereafter, the crosslinking agent and the additives may be further added to the composition.

In accordance with another embodiment of the invention, there is provided an optical display including the adhesive film. In one embodiment, the optical display may include a capacitive or resistive touch panel structure including the adhesive film. In one embodiment, the optical display may include an optical film; and an adhesive film formed on the optical film. Examples of the optical film may include polarizing plates, color filters, retardation films, elliptical polarizing films, reflective films, anti-reflective films, compensation films, brightness enhancing films, alignment films, light diffusion films, glass anti-scattering films, surface protective films, plastic LCD substrates, transparent conductive films such as ITO films, and the like. The optical film may be easily prepared by those skilled in the art using a suitable method known in the art. For example, a touch panel may be prepared by attaching a touchpad to a window or optical film using the adhesive film. Alternatively, the adhesive film may be applied to a polarizing film as in the related art. Examples of the optical display may include an organic light emitting display, a liquid crystal display, and the like, without being limited thereto.

FIG. 1 is a sectional view of a display of an organic light emitting device in accordance with one embodiment of the present invention.

Referring to FIG. 1, a display 100 of an organic light emitting device (OLED) includes a substrate 10, an OLED element 15 formed on the substrate 10, an encapsulation layer 20 encapsulating the OLED element 15, a first adhesive film 25 formed on the encapsulation layer 20, a transparent conductor formed on the first adhesive film 25 and including a base material 35, a first transparent conductive layer 40 formed on an upper side of the base material 35 and a second transparent conductive layer 30 formed on a lower side of the base material 35, a polarizing plate 45 formed on the first transparent conductive layer 40, a second adhesive film 50 formed on the polarizing plate 45, and a window 55 formed on the second adhesive film 50, wherein at least one of the first adhesive film 25 and the second adhesive film 50 may be an adhesive film according to one embodiment of the present invention.

The substrate 10 may be a suitable substrate for displays of organic light emitting devices. For example, the substrate 10 may be a thin film transistor (TFT) substrate. For example, the substrate 10 may be a glass substrate, or a plastic substrate such as a polyimide substrate, epoxy substrate, acryl substrate, silicone substrate, or the like. Alternatively, the substrate may be a flexible substrate.

Although not shown in FIG. 1, the OLED element 15 refers to a component typically used in the display of the OLED, and may include a first electrode, a second electrode, and an organic electroluminescent layer, which is formed between the first and second electrodes by sequentially stacking a hole injection layer, a hole transport layer, a light emitting layer, an electron transport layer, and/or an electron injection layer, without being limited thereto.

The encapsulation layer 20 protects the OLED element 15 from external moisture or oxygen, and may be formed of an inorganic material, an organic material, or a mixture thereof.

The transparent conductor has electrical conductivity and generates electric signals in response to external stimulation. The transparent conductor may include the base material 35 and the first and second transparent conductive layers 40 and 30 formed on both surfaces of the base material 35. The base material 35 may be an optically transparent film (for example, polycarbonate and polyester films including polyethylene terephthalate films, or the like), or a glass substrate. The first and second transparent conductive layers 40 and 30 may be formed of the same material or different materials, and may be formed of any suitable material, for example, indium tin oxide (ITO) films or metal nanowire-containing films so long as the materials of the first and second transparent conductive layers are transparent conductive films having a suitable electrical conductivity. Although not shown in FIG. 1, the first transparent conductive layer 40 and/or the second conductive layer 30 may be subjected to patterning.

The first adhesive film 25 serves to adhere the encapsulation layer 20 to the second transparent conductive layer 30, and the second adhesive film 50 serves to adhere the first transparent conductive layer 40 to the window 55. The first and second adhesive films 25 and 50 may be formed of the same or different materials, and may include the adhesive film according to one embodiment of the invention, without being limited thereto.

The polarizing plate 45 serves to reduce or prevent reflection in the display of the organic light emitting device. Although not shown in FIG. 1, the polarizing plate may include a polarizer, a protective film and/or a retardation film formed on the polarizer, without being limited thereto.

The window 55 acts as a display screen and may be formed of glass or plastic materials. Alternatively, the window may be formed of a flexible material.

Figure 2:
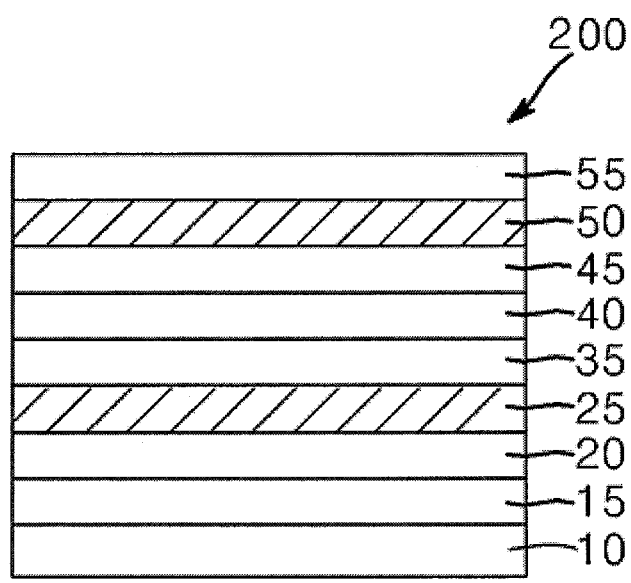
FIG. 2 is a cross-sectional view of a display of an organic light emitting device according to another embodiment of the present invention.

FIG. 2 is a sectional view of a display of an organic light emitting device in accordance with another embodiment of the present invention.

Referring to FIG. 2, a display 200 of an organic light emitting device (OLED) includes a substrate 10, an OLED element 15 formed on the substrate 10, an encapsulation layer 20 encapsulating the OLED element 15, a first adhesive film 25 formed on the encapsulation layer 20, a transparent conductor formed on the first adhesive film 25 and including a base material 35 and a first transparent conductive layer 40 formed on the base material 35, a polarizing plate 45 formed on the first transparent conductive layer 40, a second adhesive film 50 formed on the polarizing plate 45, and a window 55 formed on the second adhesive film 50, wherein at least one of the first adhesive film 25 and the second adhesive film 50 may be an adhesive film according to one embodiment of the invention.

The display unit according to this embodiment is the same as the display unit according to the above embodiment shown in FIG. 1 except for not having the second transparent conductive layer 30.

In addition, the display units for organic light emitting devices according to the embodiments of the present invention may omit the encapsulation layer 20 and/or the polarizing plate 45, if there is no problem in normal operation of the display unit.

Next, embodiments of the present invention will be described in more detail with reference to some examples. It should be understood that these examples are provided for illustration only and are not to be construed in any way as limiting the scope of present invention.

Details of components used in Examples and Comparative Examples are as follows:

(A) Photocurable monomer: (A1) 2-Ethylhexyl acrylate (EHA), (A2) Isobornyl acrylate (IBOA), (A3) 2-hydroxyethyl acrylate (HEA), (A4) Acrylic acid (AA), (A5) Acryloyl morpholine (ACMO)

(B) Initiator: Irgacure™ 651 (2,2-dimethoxy-2-phynylacetophenone)(Ciba Japan K.K.)

(C) Crosslinking agent: 1,6-hexanediol diacrylate (HDDA)

(D) Silane coupling agent: Epoxy silane (KBM-403, Shin-Eetsu Co., LTd.)

Examples 1 to 4 and Comparative Examples 1 to 3

Viscous liquids were prepared by mixing the (A) photocurable monomer in an amount as listed in Table 1 (unit: part by weight) and 0.04 parts by weight of the (B) initiator in a glass container, followed by replacing dissolved oxygen with nitrogen gas, and partially polymerizing the mixture through irradiation using a low pressure UV lamp for a few minutes. To the prepared liquids, the (C) crosslinking agent and the (D) silane coupling agent in amounts as listed in Table 1, and 0.26 parts by weight of the (B) initiator were added and sufficiently mixed to prepare the adhesive compositions.

Each of the prepared adhesive compositions was applied to a 50 μm thick polyester release film, followed by performing release treatment to form a layer having a thickness of 150 μm. In order to remove oxygen which may have a negative influence on polymerization, the adhesive is covered by the release film on both sides, and UV irradiation was performed from above the adhesive surface using a low pressure UV lamp (Sylvania BL Lamp) for about 3 minutes, thereby providing a transparent adhesive sheet.

TABLE 1

| | | Example 1 | Example 2 | Example 3 | Example 4 | Comparative Example 1 | Comparative Example 2 | Comparative Example 3 |
|---|---|---|---|---|---|---|---|---|
| (A) | (A1) (EHA) | 54 | 59 | 60 | 65 | 57 | 54 | 84 |
| | (A2) (IBOA) | 20 | 18 | — | — | 18 | 20 | — |
| | (A3) (HEA) | 25 | 22 | 35 | 35 | 22 | 25 | 15 |
| | (A4) (AA) | 1 | 1 | — | — | 3 | 1 | 1 |

TABLE 1-continued

|  | Example 1 | Example 2 | Example 3 | Example 4 | Comparative Example 1 | Comparative Example 2 | Comparative Example 3 |
|---|---|---|---|---|---|---|---|
| (A5) (ACMO) | — | — | 5 | — | — | — | — |
| (B) | 0.3 | 0.3 | 0.3 | 0.3 | 0.3 | 0.3 | 0.3 |
| (C) | 0.1 | 0.075 | 0.05 | 0.01 | 0.05 | 0.2 | 0.3 |
| (D) | 0.1 | 0.1 | 0.1 | 0.1 | 0.1 | 0.1 | 0.1 |
| Curing method | UV curing | UV curing | UV curing | UV curing | UV curing | UV curing | UV curing |

The following physical properties of the prepared adhesive films prepared in the Examples and Comparative Examples were evaluated and the results are shown in Table 2.

(1) Resistance variation: Each of the adhesive films prepared in the Examples and Comparative Examples was attached to an ITO PET film and electrodes were formed on both sides thereof using a silver paste, thereby preparing a sample. Initial resistance (P1) of the sample was measured. Next, the sample was left at 60° C./90% RH for 240 hours, followed by measurement of resistance (P2). Here, resistance was measured using a portable tester for measuring resistance, voltage, and current (Checkman, Tae Kwang Electronics Co.). To calculate resistance variation ($\Delta R$, %), the resistances obtained under the above conditions were substituted into Equation 1.

(2) Peel strength: The prepared adhesive sheet was attached to a 50 μm thick PET film (as a backing film) on one side of the adhesive film. The adhesive sheet was attached to an ITO film on the other side. Thereafter, the adhesive sheet was left for 30 minutes. Then, peel strength was measured when peeling the adhesive film from the ITO film at a rate of 300 mm/min using a texture analyzer TA.XT_Plus (Stable Micro Systems).

(3) Durability: With a polycarbonate (PC) film/ITO film/glass as a substrate and adhesive sheets attached to a PET film, the PET film was adhered to the substrate through the adhesive sheet and left at 60° C./90% RH for 500 hours, followed by observation with the naked eye to identify whether detachment, peeling, or bubbling occurred on the substrate. Standard for evaluation was as follows.
○: Good (No bubbling or peeling)
X: Poor (Severe bubbling or peeling)

(4) Storage modulus, loss modulus and tan δ: Several cured adhesive layers were stacked one above another to form an adhesive sheet having a thickness of 1 mm, followed by cutting the adhesive sheet into a circular specimen having a diameter of 8 mm. Storage modulus (G') and loss modulus (G") of the specimen were measured through frequency sweep testing using a rheology storage modulus tester (ARES, TA Instruments) at a strain of 5%, temperatures of 30° C. and 80° C. respectively, and frequencies of 10 rad/s, 1 rad/s and 100 rad/s respectively. tan δ was calculated from G"/G'.

(5) Gel fraction: After the adhesive film was immersed in an ethyl acetate solution at 23° C. for 72 hours, weight variation of the adhesive film was measured and the gel fraction was calculated according to Equation 3:

$$\text{Gel Fraction (\%)} = (A/B) \times 100, \qquad \text{Equation 3}$$

wherein A is a weight of the adhesive film measured after the adhesive film was immersed in an ethyl acetate solution at 23° C. for 72 hours and dried at 150° C. for 1 hour, and B is an initial weight of the adhesive film.

(6) Detachment Upon Bending:

Test I: A specimen including a PET film/transparent adhesive film/ITO PET/transparent adhesive film/PET was prepared and subjected to detachment testing, followed by observation for any stripe marks and bubbling.

Test II: A specimen including a PET film/transparent adhesive film/ITO PET/transparent adhesive film/polarizing plate was prepared and subjected to detachment testing, followed by observation for any stripe marks and bubbling.

Test III: A specimen including a PET Film/transparent adhesive film/ITO PET/transparent adhesive film/PC film was prepared and subjected to detachment testing, followed by observation for any stripe marks and bubbling.

In the detachment testing, the prepared specimen was bent to have a bending radius of 3 mm, and observation was made for any delamination at or near a bent portion of the specimen, followed by observation for any fine bubbles or elliptical bubbles. Here, the fine bubbles were referred to as bubbles and the elliptical bubbles were referred to as stripes. Upon bending, if no bubble or stripe mark was observed, it was denoted by an "X" and if one or more bubbles and stripes were denoted, it was denoted by an "○".

TABLE 2

|  | Example 1 | Example 2 | Example 3 | Example 4 | Comparative Example 1 | Comparative Example 2 | Comparative Example 3 |
|---|---|---|---|---|---|---|---|
| Resistance variation (%) | 3% | 3% | 2% | 2% | 5% | 3% | 3% |
| Peel strength (gf/25 mm) | 1900 | 2030 | 2700 | 1700 | 2400 | 1930 | 2000 |
| Durability | ○ | ○ | ○ | ○ | ○ | ○ | ○ |
| G' ($\times 10^5$ dyne/cm$^2$, 1 rad/s, 30° C.) | 3.15 | 2.66 | 1.7 | 3.4 | 2.38 | 3.15 | 4.8 |
| G" ($\times 10^4$ dyne/cm$^2$, 1 rad/s, 30° C.) | 5.82 | 4.24 | 2.44 | 5.4 | 5.6 | 7.36 | 15.6 |
| tan δ (30° C., 1 rad/s) | 0.18 | 0.159 | 0.14 | 0.159 | 0.235 | 0.234 | 0.325 |

TABLE 2-continued

|  | Example 1 | Example 2 | Example 3 | Example 4 | Comparative Example 1 | Comparative Example 2 | Comparative Example 3 |
|---|---|---|---|---|---|---|---|
| G' (×10⁵ dyne/cm², 100 rad/s, 30° C.) | 5.4 | 4.3 | 3.2 | 5.98 | 7.01 | 9.55 | 18.5 |
| G" (×10⁵ dyne/cm², 100 rad/s, 30° C.) | 1.87 | 1.47 | 1.76 | 3.65 | 6.25 | 8.63 | 19.2 |
| tan δ (30° C., 100 rad/s) | 0.34 | 0.34 | 0.55 | 0.61 | 0.89 | 0.9 | 1.04 |
| G' (×10⁵ dyne/cm², 1 rad/s, 80° C.) | 3.15 | 2.66 | 3.55 | 1.9 | 1.99 | 3.17 | 2.46 |
| Gel fraction (%) | 85 | 75 | 74 | 74 | 74 | 91 | 92 |
| Detachment upon bending I | X | X | X | X | ○ | ○ | ○ |
| Detachment upon bending II | X | X | X | X | ○ | ○ | ○ |
| Detachment upon bending III | X | X | X | X | ○ | ○ | ○ |

As shown in Table 2, the adhesive films according to embodiments of the present invention had a tan δ in suitable ranges upon frequency sweep testing under conditions of a strain of 5%, 30° C. and 1 rad/s, and upon frequency sweep testing under conditions of a strain of 5%, 30° C. and 100 rad/s, thereby providing excellent properties in terms of bending properties, adhesion, durability, and reliability. Therefore, the transparent adhesive film according to embodiments of the present invention may have good bending properties and does not suffer from detachment, bubbling or drag marks under bending conditions while securing high durability and reduced (or minimized) resistance.

Conversely, the adhesive films prepared in Comparative Examples 1 to 3 had a tan δ not in the range according to embodiments of the present invention, exhibited poor bending properties, and suffered from detachment, bubbling or drag marks under bending conditions, and poor durability and reliability.

It should be understood that various modifications, changes, alterations, and equivalent embodiments may be made by those skilled in the art without departing from the spirit and scope of the invention, defined by the following claims, and equivalents thereof.

What is claimed is:

1. An adhesive film having a tan δ of about 0.12 to about 0.4 upon frequency sweep testing under conditions of a strain of 5%, 30° C. and 1 rad/s and a tan δ of about 0.2 to about 0.7 upon frequency sweep testing under conditions of a strain of 5%, 30° C. and 100 rad/s.

2. The adhesive film according to claim 1, wherein the adhesive film has a storage modulus of about 7×10⁴ dyne/cm² to about 1×10⁷ dyne/cm² and a loss modulus of about 1×10⁴ dyne/cm² to about 8×10⁶ dyne/cm² upon frequency sweep testing under conditions of a strain of 5%, 30° C. and 1 rad/s.

3. The adhesive film according to claim 1, wherein the adhesive film has a storage modulus of about 1×10⁵ dyne/cm² to about 5×10⁷ dyne/cm² and a loss modulus of about 1×10⁴ dyne/cm² to about 3×10⁷ dyne/cm² upon frequency sweep testing under conditions of a strain of 5%, 30° C. and 100 rad/s.

4. The adhesive film according to claim 1, wherein the adhesive film has a storage modulus of about 1×10³ dyne/cm² to about 5×10⁶ dyne/cm² upon frequency sweep testing under conditions of a strain of 5%, 80° C. and 1 rad/s.

5. The adhesive film according to claim 1, wherein the adhesive film has a gel fraction of about 40% to about 90%.

6. The adhesive film according to claim 1, wherein the adhesive film has a resistance variation of about 5% or less as calculated according to Equation 2:

$$\Delta R = \frac{P_2 - P_1}{P_1} \times 100 \qquad \text{Equation 2}$$

where $P_1$ is an initial resistance measured on a sample of the adhesive film with electrodes formed at both ends of the adhesive film, and $P_2$ is resistance of the sample after storage at 60° C./90% relative humidity for 240 hours.

7. The adhesive film according to claim 1, wherein the adhesive film is formed of an adhesive composition comprising a (meth)acrylic copolymer, an initiator and a crosslinking agent, wherein the (meth)acrylic copolymer being a polymerization reaction product of a mixture of (meth)acrylic monomers.

8. The adhesive film according to claim 7, wherein the adhesive composition comprises: about 100 parts by weight of the (meth)acrylic copolymer; about 0.01 to about 0.15 parts by weight of the crosslinking agent, and about 0.1 to about 10 parts by weight of the initiator.

9. The adhesive film according to claim 8, wherein the mixture of the (meth)acrylic monomers comprises less than about 3 wt % of a carboxylic acid group-containing vinyl monomer.

10. The adhesive film according to claim 7, wherein the mixture of the (meth)acrylic monomers comprises about 60 wt % to about 100 wt % of a monomer having a glass transition temperature (Tg) of less than 80° C. and, about 40 wt % or less of a monomer having a glass transition temperature (Tg) of 80° C. or more.

11. The adhesive film according to claim 7, wherein the mixture of the (meth)acrylic monomers comprises about 40 wt % to about 60 wt % of an alkyl group-containing (meth) acrylic monomer, about 20 wt % to about 50 wt % of a hydroxyl group-containing (meth)acrylic monomer, about 1 wt % to about 30 wt % of an alicyclic group-containing (meth)acrylic monomer, and about 1 wt % to about 2 wt % of a carboxylic acid group-containing (meth)acrylic monomer.

12. The adhesive film according to claim 7, wherein the mixture of the (meth)acrylic monomers comprises about 60 wt % to about 65 wt % of an alkyl group-containing (meth)acrylic monomer, about 30 wt % to about 35 wt % of a hydroxyl group-containing (meth)acrylic monomer, and about 1 wt % to about 5 wt % of a hetero-alicyclic group-containing (meth)acrylic monomer.

13. The adhesive film according to claim 7, wherein the mixture of the (meth)acrylic monomers comprises about 60 wt % to about 70 wt % of an alkyl group-containing (meth)acrylic monomer and about 30 wt % to about 40 wt % of a hydroxyl group-containing (meth)acrylic monomer.

14. The adhesive film according to claim 7, wherein the adhesive composition further comprises a silane coupling agent.

15. The adhesive film according to claim 14, wherein the silane coupling agent comprises an epoxy moiety.

16. The adhesive film according to claim 14, wherein the silane coupling agent is present in an amount of about 0.01 to about 1 part by weight based on 100 parts by weight of the (meth)acrylic copolymer.

17. An optical display comprising:
a substrate;
an OLED element on the substrate;
an encapsulation layer on the OLED element to encapsulate the OLED element;
a first adhesive film on the encapsulation layer;
a transparent conductor on the first adhesive film and comprising a base material, a first transparent conductive layer on an upper side of the base material and a second transparent conductive layer on a lower side of the base material;
a polarizing plate on the first transparent conductive layer;
a second adhesive film on the polarizing plate; and
a window on the second adhesive film, wherein at least one of the first adhesive film and second adhesive film comprises the adhesive film according to claim 1.

* * * * *